United States Patent [19]

Bubik et al.

[11] 4,192,710

[45] Mar. 11, 1980

[54] METHOD AND APPARATUS FOR MEASURING THE THROUGHFLOW QUANTITY OF A LIQUID SUBSTANCE PER UNIT OF TIME IN A PAPERMAKING MACHINE

[75] Inventors: Alfred Bubik, Ravensburg; Rainer Jox, Weingarten; Hans-Joachim Schultz, Ravensburg-Oberhofen, all of Fed. Rep. of Germany

[73] Assignee: Escher Wyss GmbH, Ravensburg, Fed. Rep. of Germany

[21] Appl. No.: 948,689

[22] Filed: Oct. 5, 1978

[30] Foreign Application Priority Data

Oct. 20, 1977 [CH] Switzerland .................. 12786/77

[51] Int. Cl.² .................. D21F 1/06; F16L 55/04
[52] U.S. Cl. .................. 162/198; 162/259; 162/263; 162/343
[58] Field of Search ............. 162/252, 253, 258, 259, 162/198, 263, 343; 137/574

[56] References Cited

U.S. PATENT DOCUMENTS

| | | | |
|---|---|---|---|
| 3,725,197 | 4/1973 | Dahl et al. | 162/343 |
| 3,741,865 | 6/1973 | Lejeune | 162/317 |
| 3,923,593 | 12/1975 | Veresput | 162/343 |
| 3,939,037 | 2/1976 | Hill | 162/343 |
| 3,993,537 | 11/1976 | Bironstad | 162/252 |
| 4,014,738 | 3/1977 | Prechtel | 162/259 |
| 4,021,295 | 5/1977 | Schmaeng | 162/380 |
| 4,086,130 | 4/1978 | Justus | 162/259 |
| 4,087,321 | 5/1978 | Schultz | 162/343 |
| 4,146,052 | 3/1979 | Bubik et al. | 162/343 |

FOREIGN PATENT DOCUMENTS

2459495  7/1976  Fed. Rep. of Germany .......... 162/259

*Primary Examiner*—S. Leon Bashore
*Assistant Examiner*—Steve Alvo
*Attorney, Agent, or Firm*—Werner W. Kleeman

[57] ABSTRACT

A method of, and apparatus for, measuring the throughflow quantity of a liquid substance per unit of time in a papermaking machine, wherein the measurement is undertaken on the basis of the pressure drop at a throttling element, there being used as the throttling element a perforated plate having a multiplicity of parallel channels through which the substance flows.

9 Claims, 5 Drawing Figures

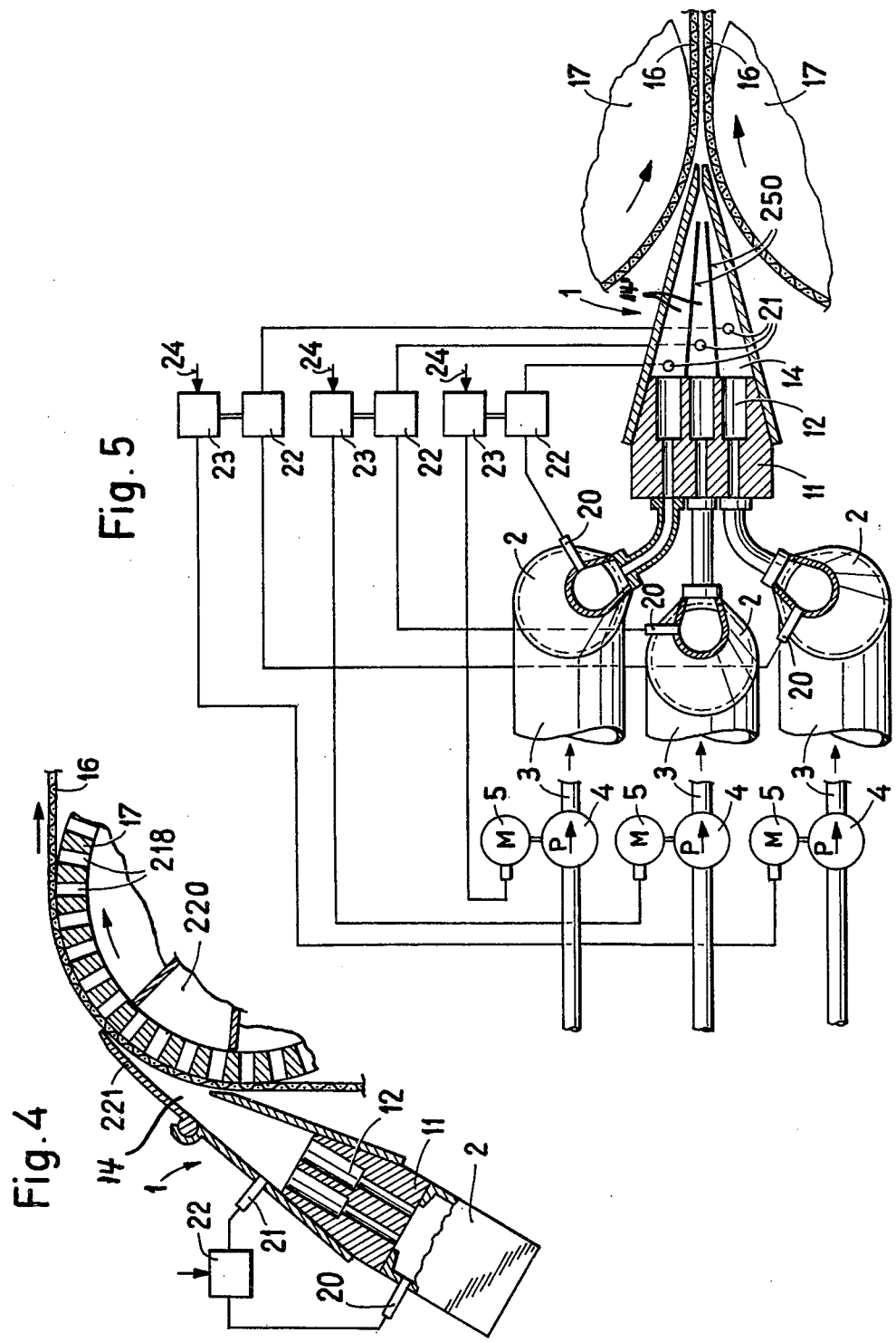

METHOD AND APPARATUS FOR MEASURING THE THROUGHFLOW QUANTITY OF A LIQUID SUBSTANCE PER UNIT OF TIME IN A PAPERMAKING MACHINE

BACKGROUND OF THE INVENTION

The present invention relates to a new and improved method of measuring the throughflow quantity of a liquid substance per unit of time in a papermaking machine based upon the pressure drop which appears at a throttling element, also referred to herein as a throttle element.

Furthermore, the invention relates to novel apparatus for the performance of the aforesaid method at a papermaking machine, comprising a throttle or throttling element arranged in the direction of flow of the liquid substance, typically pulp, and furthermore, relates to a device for measuring the pressure drop at such throttle element by comparison of the pressure forwardly and behind such throttle element.

The measurement of the throughflow quantity per unit of time of a liquid substance is of particular importance for regulation purposes in the case of papermaking machines. Thus, for instance, it has been proposed, in order to obtain paper having a constant surface or unit weight, to infeed a throughflow quantity of the liquid substance, which is constant per unit of time, and specifically, independent of the dewatering capability of the fiber web. The heretofore known methods and apparatuses for measuring this relatively large throughflow quantity are however not satisfactory.

In many instances, heretofore the throughflow quantity was calculated from the settings of the cross-section at the substance or material receiver, or, is derived on the basis of the power consumption of the pump which infeeds the liquid substance, typically the fibrous suspension or pulp in the case of a papermaking machine.

A more exact determination of the throughflow quantity is only possible by resorting to the use of throughflow meters. As a general rule, there were heretofore used for this purpose electrically inductive throughflow meters. These throughflow meters require, however, adherence to exactly prescribed assembly or installation conditions, typically for instance, long linear tubular sections before and after the measuring instrument, in order to avoid falsification of the measurement result. Air bubbles or other physical or chemical inhomogeneties in the flow unfavorably affect the measurement result. The devices themselves are quite expensive for thick tubular conduits which are present at papermaking machines.

Other measuring techniques exploiting the measurement of the pressure drop at a throttle element, such as for instance a diaphragm, nozzle or a Venturi nozzle, have not found any widespread practical application in the papermaking industry. Such type throttling elements, as a general rule, are not suitable for use with fibrous suspensions. They lead to high pressure losses, and equally require an exact adherence to prescribed installation conditions.

SUMMARY OF THE INVENTION

Therefore, with the foregoing in mind it is a primary object of the present invention to provide a new and improved method, and apparatus for, measuring the throughflow quantity of a liquid substance per unit of time in a papermaking machine, in a manner not associated with the aforementioned drawbacks and limitations of the prior art proposals.

Still another and more specific object of the present invention is directed to the provision of a new and improved method and apparatus, by means of which the aforementioned drawbacks can be effectively overcome or at least appreciably minimized, and rendering possible exact measurement of the throughflow quantity with the aid of existing means, without having to accept additional pressure drop and thus increased power consumption.

Yet a further significant object of the present invention is directed to a novel method of, and apparatus for measuring in an extremely accurate, reliable and positive manner the throughflow quantity of a liquid substance, typically a fibrous suspension or pulp, per unit of time, at a papermaking machine.

Now in order to implement these and still further objects of the invention, which will become more readily apparent as the description proceeds, the method aspects of the present development are manifested by the features that as the throttle element there is used a perforated plate having a multiplicity of parallel channels through which flows the liquid substance.

As mentioned above, the invention is not only concerned with the aforementioned method aspects, but furthermore, relates to novel apparatus for the performance thereof, for use with a papermaking machine, wherein there is provided a throttle element arranged in the direction of flow of the liquid substance, and furthermore, there is provided a device for measuring the pressure drop at such throttle element by comparing the pressure drop ahead of and behind such throttle element. Importantly, as the throttle element there is used a perforated plate having a number of parallel channels through which flows the liquid substance.

The perforated plates, which, for instance, are known in a refined form having step-like widened portions from the commonly assigned U.S. Pat. No. 3,725,197, granted Apr. 3, 1973, to which reference may be readily had and the disclosure of which is incorporated herein by reference, are used in the substance receiver or headbox of the papermaking machine for the uniform distribution of the liquid substance over the width of the papermaking machine. It has already been successfully proposed to use a perforated plate, according to the teachings of the aforementioned U.S. Pat. No. 3,725,197, in a damping container through which flows the liquid substance.

It should be understood that the channels of the perforated plate need not be widened in a step-like fashion, rather also can contain straight cylindrical bores.

According to the invention the determination of the pressure drop at such type already available perforated plates, renders possible an extremely exact measurement of the throughflow quantity per unit of time, and specifically, without any additional pressure drop and with minimum expenditure. The perforated plate, particularly such having channels with step-like widened portions, is namely always so installed that at the same time a flow of material occurs through all of its channels. Additionally, at a perforated plate having step-like widened channels, there is realized an extremely fine, uniform turbulence of the liquid substance, so that during the measurement there do not occur any pressure fluctuations which could adversely affect the measurement result.

Hence, with minimum expenditure of means there is obtained a measurement having greater accuracy than possible with heretofore known measuring methods and measuring apparatuses.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 4 illustrates the use of the invention at a suction former; and

FIG. 5 illustrates a multiple ply-substance receiver or headbox equipped with the inventive measuring apparatus.

DETAILED DESCRIPTION OF THE PREFERRED EMBODIMENTS

Figure 1:
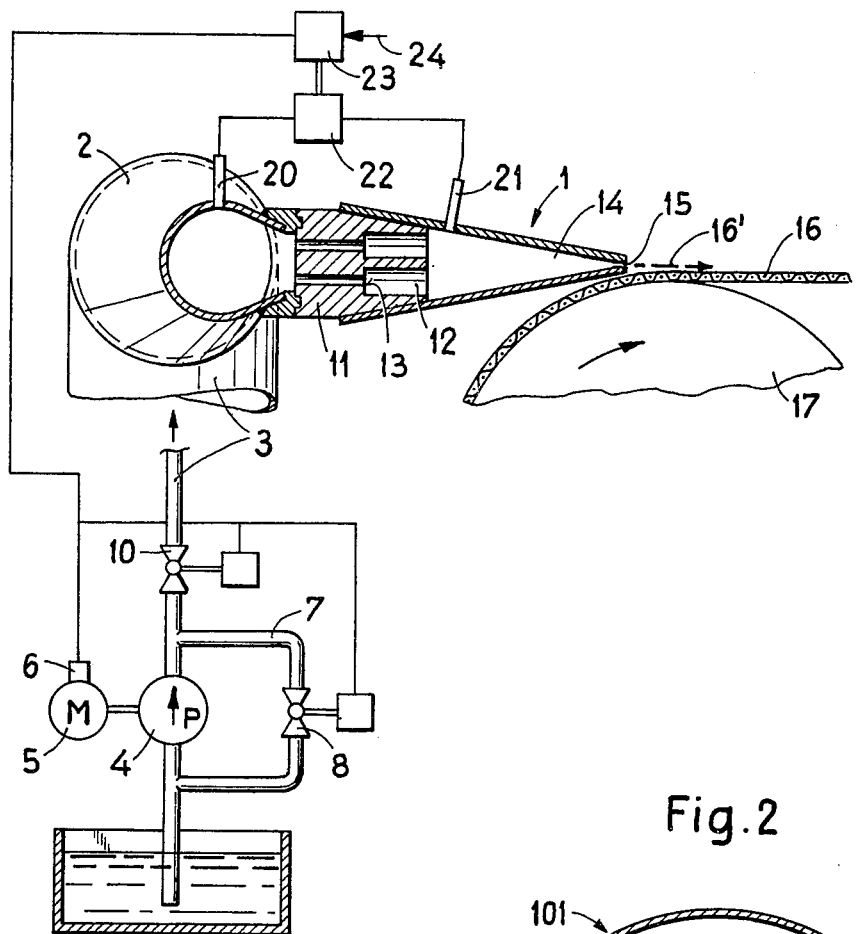
FIG. 1 is a schematic illustration of a papermaking machine equipped with a substance receiver or headbox, a substance pump and a sieve or screen.

Describing now the drawings, it is to be understood that only enough of the construction of the papermaking machine has been shown to enable those skilled in the art to readily understand the underlying principles and concepts of the present development and to simplify the showing of the drawings. Hence, the schematically illustrated papermaking machine, shown in FIG. 1, will be seen to comprise a substance receiver or headbox 1 which in not particularly illustrated, but conventional manner, has a conically tapering distributor duct or conduit 2. This distributor duct or conduit 2, as schematically illustrated, is connected in flow communicating relationship with a substance line or conduit 3 having a substance pump 4. The substance pump 4 is driven by a suitable electric motor 5 having a rotational speed regulator 6. The liquid substance which is being handled is here, in the case of a papermaking machine, a fibrous suspension or pulp. Additionally, the pump 4 is equipped with a return flow line or conduit 7 in which there is located a regulating valve 8. Finally, in the substance line or conduit 4 there is shown as an optional element a throttle valve 10.

As also apparent from the illustration of FIG. 1, a perforated plate 11, arranged in the substance receiver or headbox 1, merges with the distributor duct or conduit 2. This perforated plate 11 has a number of essentially parallel substance channels 12 through which flows the liquid substance. In the embodiment under discussion the substance channels 12 are in the form of step-like widened portions 13. In this case the step-like widened portions 13 are at right angles, i.e., orthogonally disposed with respect to the lengthwise axis of the channels 12, but, however, also could be arranged at another angle. The channels 12 also could be in the form of simple cylindrical channels.

Merging with the perforated plate 11 is a tapered substance receiver channel 14 terminating in an outflow or outlet gap or mouth 15 from which effluxes, towards the outside, a jet 16' of the liquid substance, e.g. the fibrous suspension or pulp. The jet 16', in the illustrated embodiment, is deposited onto a screen 16 which is guided over a cylinder 17 as is well known in the papermaking art.

As further apparent from the showing of FIG. 1, the distributor conduit or duct 2 is provided with a pressure feeler or sensor 20. There is also arranged a pressure feeler or sensor 21 in the receiver channel 14. The signals of the pressure feelers 20 and 21 are infed to a measuring device 22 which forms a comparison signal, for instance a difference signal. This comparison signal is then fed to a regulator 23 which compares it with a reference value or set magnitude as generally indicated by the arrow 24. The regulator 23 forms a regulation or control signal which is delivered to the rotational speed regulator 6 of the electric motor 5. As shown in FIG. 1, the regulation or control signal also can be infed to the regulation control valves 8 or 10.

Now in the embodiment of FIG. 1 there have been shown for the sake of illustrating the invention, three different possibilities for regulating the substance infeed, namely by means of the rotational speed regulator 6 and the valves 8 and 10. It should be however understood that normally only one of these three possibilities is employed in practice.

Figure 2:
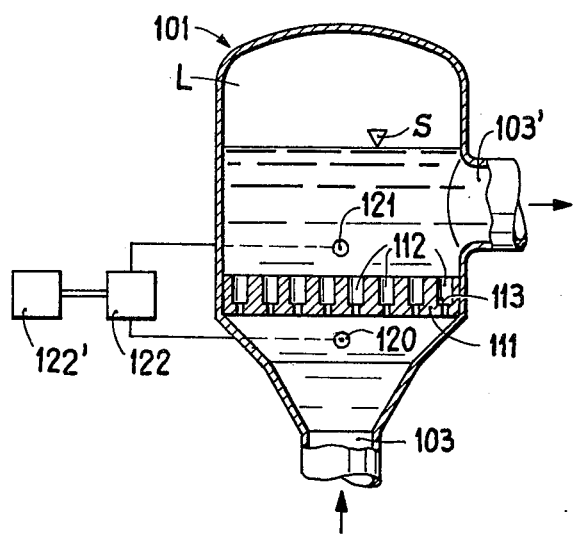
FIG. 2 is a schematic sectional view of a damping container having a perforated plate.

Continuing, with the modified arrangement of FIG. 2 there is shown a damping container or reservoir 101 which has an infeed line 103 and an outfeed line 103'. Between both lines 103 and 103' there is located a perforated plate 111 having the channels 112. As illustrated, these channels 112 can have step-like widened portions 113, but however also can be, for instance, cylindrical or possess different cross-sectional shapes. The liquid substance forms within the damping container 101 a liquid level S over which there is located an air space or chamber L.

As also best seen by referring to FIG. 2, ahead of the perforated plate 111 and after such there are arranged the respective pressure sensors or feelers 120 and 121, from which lead the measuring lines or conductors to a comparison device or comparator 122, which, in turn, delivers its comparison signal to a measuring device 122'. This measuring device 122' either can be a display or indicator device which indicates the throughflowing quantity of substance per unit of time, or it can, also like the device 23 of the arrangement of FIG. 1, form a regulation or control signal which then is infed to a not particularly illustrated regulation or control device, like the valves and/or motor referred to above with respect to FIG. 1.

The damping container 101 can be employed at any suitable location of the papermaking machine. Thus, it can be arranged, by way of example, in the line or conduit 3, in order to even out fluctuations predicated upon the operation of the substance or stuff pump 4.

Figure 3:
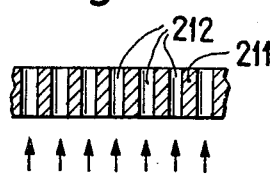
FIG. 3 illustrates a further possibility of constructing the perforated plate for the arrangements of FIGS. 1 and 2.

Now in FIG. 3 there is schematically shown a further possibility for constructing the perforated plate, here designated by reference character 211. The perforated plate 211, as shown in FIG. 3, will be seen to contain channels 212 having essentially constant cylindrical cross-sectional configuration. As mentioned, any of the other arrangements heretofore disclosed or hereinafter disclosed can be provided with such type of constant cylindrical cross-sectional channels.

The apparatus shown in FIG. 4, differs from the arrangement of FIG. 1, a section of which is here shown, only inasmuch as, with this modified arrangement, the substance receiver 1 is employed at a suction former, which will be discussed more fully hereinafter. The cylinder 17 contains bores 218 and is provided with a schematically illustrated suction box 220 of the suction former. The substance receiver channel 14 here has a pre-lip 221 extending along the surface of the cylinder 17. The remaining parts, corresponding to the construction shown in FIG. 1, have been conveniently designated with the same reference characters.

Finally, in FIG. 5 there is shown the use of the invention in conjunction with a multiple ply-substance receiver, in whose substance receiver channel 14 there are arranged partition or separation walls 250. These partition walls 250 divide the receiver channel 14 into three partial channels and are generally designated by reference character 14', serving for the throughflow of the liquid substance. The jet of the liquid substance is infed between two sieves or screens 16 or equivalent structure, guided over the two cylinders 17.

The only difference in relation to the equipment of FIG. 1, in this case resides in the fact that three distributor ducts or conduits 2 are here provided, and specifically, each for a different quality of the liquid substance e.g. fibrous suspension or pulp. Each distributor duct or conduit 2 has operatively associated therewith a separate substance line or conduit 3 having a substance pump 4, as shown. Moreover, here also in FIG. 5 there have conveniently been used the same reference characters, as employed for the arrangement of FIG. 1, for the same or analogous components.

While there are shown and described present preferred embodiments of the invention, it is to be distinctly understood that the invention is not limited thereto, but may be otherwise variously embodied and practiced within the scope of the following claims. Accordingly,

What we claim is:

1. A method for measuring the throughflow quantity of a liquid substance in the form of a fibrous suspension per unit of time in papermaking machine, comprising the steps of:
    providing a throttle element in the form of a performed plate having a number of essentially parallel channels through which flows the liquid substance therethrough with only a fine turbulence;
    infeeding the liquid substance to said perforated plate for throughflow in a predetermined direction of flow through said essentially parallel channels; and
    measuring the pressure drop at the throttle element essentially directly upstream and downstream of the throttle element with respect to the direction of flow of the liquid substance and wherein during the measurement of the pressure drop there does not occur any pressure fluctuations which adversely affect the measurement.

2. The method as defined in claim 1, further including the steps of:
    utilizing a perforated plate as the throttle element whose friction has negligible effect on the measurement of the pressure drop.

3. An apparatus for measuring the throughflow quantity of a liquid substance in the form of a fibrous suspension per unit of time at a papermaking machine, comprising:
    a throttle element arranged in a predetermined direction of flow of the liquid substance;
    means for infeeding the liquid substance for flow through the throttle element;
    a device for measuring the pressure drop across the throttle element;
    means for comparing the pressure measured forwardly of and behind said throttle element; and
    said throttle element comprising a perforated plate having a multiplicity of essentially parallel channels through which flows the liquid substance and structured so that the liquid substance flowing therethrough has imparted thereto an extremely fine, essentially uniform turbulence; and said pressure measuring device comprises two pressure sensors positioned to measure the pressure drop directly forwardly and directly rearwardly of said throttle element, so that during the measurement there does not occur any pressure fluctuations that adversely affect the measurement.

4. The apparatus as defined in claim 3, wherein:
    said means for infeeding the liquid substance comprises a damping container through which flows the liquid substance; and
    said perforated plate being arranged in said damping container.

5. The apparatus as defined in claim 3, wherein:
    said channels of said perforated plate possess substantially step-like widened portions.

6. The apparatus as defined in claim 5, wherein:
    said means for infeeding the liquid substance comprises a substance receiver;
    said perforated plate being arranged in the substance receiver of the papermaking machine and serving for the distribution of the liquid substance over the width of the papermaking machine.

7. The apparatus as defined in claim 5, wherein:
    said means for infeeding the liquid substance comprises a damping container through which flows the liquid substance; and
    said perforated plate being arranged in said damping container.

8. The apparatus as defined in claim 3, wherein:
    said means for infeeding the liquid substance includes a substance receiver; and
    said perforated plate being arranged in the substance receiver of the papermaking machine and serving for the distribution of the liquid substance over the width of the papermaking machine.

9. The apparatus as defined in claim 3, wherein:
    said perforated plate has friction characteristics having negligible effect on the measurement of the presure drop across the throttle element.

* * * * *